United States Patent
Shin

(10) Patent No.: US 12,518,338 B2
(45) Date of Patent: Jan. 6, 2026

(54) MACHINE LEARNING MODELS FOR IMAGE INJECTION THAT COMPENSATE FOR ARTIFACTS

(71) Applicant: GOOGLE LLC, Mountain View, CA (US)

(72) Inventor: Dongeek Shin, San Jose, CA (US)

(73) Assignee: Google LLC, Mountain View, CA (US)

( * ) Notice: Subject to any disclaimer, the term of this patent is extended or adjusted under 35 U.S.C. 154(b) by 232 days.

(21) Appl. No.: 18/171,889

(22) Filed: Feb. 21, 2023

(65) Prior Publication Data

US 2024/0281918 A1    Aug. 22, 2024

(51) Int. Cl.
| | |
|---|---|
| G06T 1/20 | (2006.01) |
| G02B 27/01 | (2006.01) |
| G06F 3/14 | (2006.01) |
| G06V 10/74 | (2022.01) |

(52) U.S. Cl.
CPC .............. G06T 1/20 (2013.01); G02B 27/017 (2013.01); G06F 3/14 (2013.01); G06V 10/761 (2022.01); G02B 2027/0178 (2013.01)

(58) Field of Classification Search
CPC ........... G06T 1/20; G06F 3/14; G02B 27/017; G02B 2027/0178; G06V 10/761
See application file for complete search history.

(56) References Cited

U.S. PATENT DOCUMENTS

| | | | |
|---|---|---|---|
| 2004/0141157 A1 | 7/2004 | Ramachandran et al. | |
| 2019/0005603 A1 | 1/2019 | Chen et al. | |
| 2022/0076071 A1* | 3/2022 | Hiasa | G06V 10/70 |
| 2022/0378310 A1* | 12/2022 | Foster | A61B 5/7267 |
| 2023/0179736 A1* | 6/2023 | Pohl | G06V 10/443 |
| | | | 348/445 |
| 2023/0222628 A1* | 7/2023 | Zhao | G06V 40/168 |
| | | | 382/156 |
| 2023/0353652 A1* | 11/2023 | Bi | H04L 67/55 |
| 2024/0169488 A1* | 5/2024 | Liu | G06T 5/70 |

OTHER PUBLICATIONS

Higham et al., "Deep learning for real-time single-pixel video", Scientific Reports, 8:2369, 9 pages, Feb. 5, 2018, https://doi.org/10.1038/s41598-018-20521-y.

Liu et al., "A Stacked Autoencoder-Based Deep Neural Network for Achieving Gearbox Fault Diagnosis", Hindawi, Mathematical Problems in Engineering, vol. 2018, Article ID 5105709, 10 pages, Jul. 25, 2018, https://doi.org/10.1155/2018/5105709.

Yoo, "Summary of 'Designing an Encoder for StyleGAN Image Manipulation", Designing an Encoder for StyleGAN Image Manipulation (SIGGRAPH 2021), Aug. 19, 2021, 13 pages.

Zhang , et al., "Deep Learning-Based Inverse Method for Layout Design", Structural and Multidisciplinary Optimization vol. 60;, Feb. 23, 2019, pp. 527-536.

* cited by examiner

Primary Examiner — Daniel F Hajnik
Assistant Examiner — Jed-Justin Imperial
(74) Attorney, Agent, or Firm — Brake Hughes Bellermann LLP

(57) ABSTRACT

A method including an image is received, a modified image is generated based on the image using a trained machine learning model, a rendered image is generated based on the modified image using an image injection pipeline, and the rendered image is displayed on a display of a wearable device.

20 Claims, 7 Drawing Sheets

MACHINE LEARNING MODELS FOR IMAGE INJECTION THAT COMPENSATE FOR ARTIFACTS

FIELD

Implementations relate to rendering images on a display of a wearable device.

BACKGROUND

Virtual reality (VR)/augmented reality (AR) devices typically include overlay displays on which an image can be displayed. The image can be captured by a camera of the VR/AR device or received from a companion device.

SUMMARY

Example implementations can use a trained machine learning (ML) model to modify an image to be displayed on an overlay display of a wearable device. The image can be modified before image data is input to a rendering pipeline. The modified image can improve the perceptual qualities of the displayed image by reducing or eliminating artifacts in the displayed image caused by the rendering pipeline in the displayed image. In other words, the ML model can modify an image to have pixel modifications that improve a displayed image quality when artifacts are introduced by the rendering pipeline.

In a general aspect, a device, a system, a non-transitory computer-readable medium (having stored thereon computer executable program code which can be executed on a computer system), and/or a method can perform a process with a method including an image is received, a modified image is generated based on the image using a trained machine learning model, a rendered image is generated based on the modified image using an image injection pipeline, and the rendered image is displayed on a display of a wearable device.

In a general aspect, a device, a system, a non-transitory computer-readable medium (having stored thereon computer executable program code which can be executed on a computer system), and/or a method can perform a process with a method including a ground-truth image is received, a modified image is generated based on the image using a machine learning model, a rendered image is generated based on the modified image using an image injection pipeline, and the machine learning model is trained based on a comparison of the rendered image to the ground-truth image.

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations.

It should be noted that these Figures are intended to illustrate the general characteristics of methods, and/or structures utilized in certain example implementations and to supplement the written description provided below. These drawings are not, however, to scale and may not precisely reflect the precise structural or performance characteristics of any given implementation and should not be interpreted as defining or limiting the range of values or properties encompassed by example implementations. For example, the positioning of modules and/or structural elements may be reduced or exaggerated for clarity. The use of similar or identical reference numbers in the various drawings is intended to indicate the presence of a similar or identical element or feature.

DETAILED DESCRIPTION

A wearable device can include, for example, an AR headset, a MR headset, a VR headset, ahead mount display (HMD), a smart glasses, a watch, a ring, a fitness device, and/or the like. In an example implementation, the wearable device can be a smart glasses including a transparent or overlay display. In another example implementation, other devices may include a transparent or overlay display. For example, a heads-up display (e.g., in an automobile) can include a transparent or overlay display.

Wearable or other devices configured to display an image on a transparent display can include a rendering pipeline to render M×N image data on the transparent display. The rendering pipeline can include a light engine assembly (LEA) and a see-through stack assembly (STA) pipeline. A problem with the rendering pipeline for such devices (as opposed to devices with conventional, non-transparent displays) can be the introduction of artifacts (e.g., ghosting) into a displayed image. The artifacts can reduce the quality of the displayed image causing a lower quality user experience.

Example implementations can modify the image to be projected on a transparent display (i.e., displayed on the display) before the image data is input to the rendering pipeline. The modified image can improve the perceptual qualities of the displayed image by reducing or eliminating artifacts in the displayed image. For example, a model can be trained to modify an image to substantially eliminate artifacts caused by the rendering pipeline in the displayed image. Put another way, the model may be trained to add artifacts to the image that will be canceled out (counter) in the rendering pipeline, resulting in a higher quality image for projection. Substantially eliminating artifacts caused by the rendering pipeline can improve overall viewing experience of a user viewing an image displayed by the wearable device.

Figure 1:
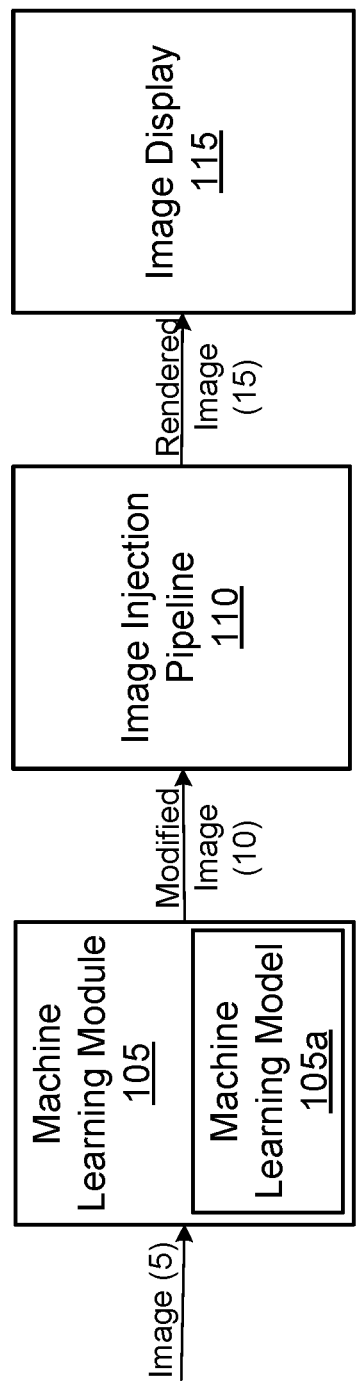
FIG. 1 illustrates a block diagram of a data flow for displaying an image according to an example implementation.

FIG. 1 illustrates a block diagram of a data flow for displaying an image according to an example implementation. As shown in FIG. 1, the data flow includes a machine learning (ML) module 105, an image injection pipeline 110, and an image display 115. The image injection pipeline 110 can introduce artifacts to an image. The ML module 105 can be configured to modify the image to counter the artifacts introduced by the image injection pipeline 110. The ML module 105 can include at least one ML model 105a configured to modify an image.

In an example implementation, an image 5 can be input to the ML module 105. The image 5 can be generated by a wearable device and/or by a companion device associated with the wearable device. The image 5 can be modified by the ML module 105 (e.g., using ML model 105a) to generate a modified image 10. The modified image 10 can be input to the image injection pipeline 110 to generate a rendered image 15. The modified image 10 is sometimes called an intermediate image or an injected image because the modified image 10 is injected into the image rendering pipeline. The modified image 10 can include inversion effects (e.g., opposite effects) that can compensate for artifacts introduced by the image injection pipeline 110. In other words, the ML module 105 is trained to generate the modified image 10 by adding the inversion effects, also referred to as inversion artifacts, to the image 5. The rendered image 15 can be displayed on the image display 115.

The image injection pipeline 110 can be configured to convert a digital version of an image to an image projected onto a transparent or overlay display. The image injection pipeline 110 can include a light engine assembly (LEA) and a see-through stack assembly (STA) (not shown). An LEA can include a red laser-diode (R) a green laser-diode (G), and a blue laser-diode (B). The red laser-diode can be driven with a red drive-current, the green laser-diode can be driven with a green drive-current, and the blue laser-diode can be driven with a blue drive-current so that the red, green, and blue light from the laser diodes forms a color on the visible spectrum when combined. The LEA may include other laser diode configurations (e.g., one laser, alternate colors, and the like). The LEA can include a scanning mirror assembly configured to collect and reflect light from a beam splitter. The scanning mirror assembly and the beam splitter can introduce artifacts into a displayed image. The STA can be configured as an image layer combiner. The STA can be configured to combine light emitting from objects to an eye without distortions. The STA can introduce artifacts into a displayed image.

The artifacts introduced by the LEA and STA can be consistent and/or predictable. For example, the artifacts introduced by the LEA and STA can be consistent based on characteristics of the image. For example, the artifacts introduced by the LEA and STA can be consistent based on luminance, luminance uniformity, color, color uniformity, contrast, light direction, pixel position, pixel patterns and/or the like. Therefore, The ML model of the ML module 105 can be trained to counter the artifacts introduced by the LEA and STA of the image injection pipeline 110. The image display 115 can be any display configured to display the image rendered by the image injection pipeline 110. The image display 115 can be a transparent or overlay display of a wearable device. A transparent or overlay display can be a portion of a transparent object (e.g., a wearable glasses lens) configured to present a projected image to a viewer. The transparent or overlay display can be transparent to the viewer when no image is projected.

Figure 2:
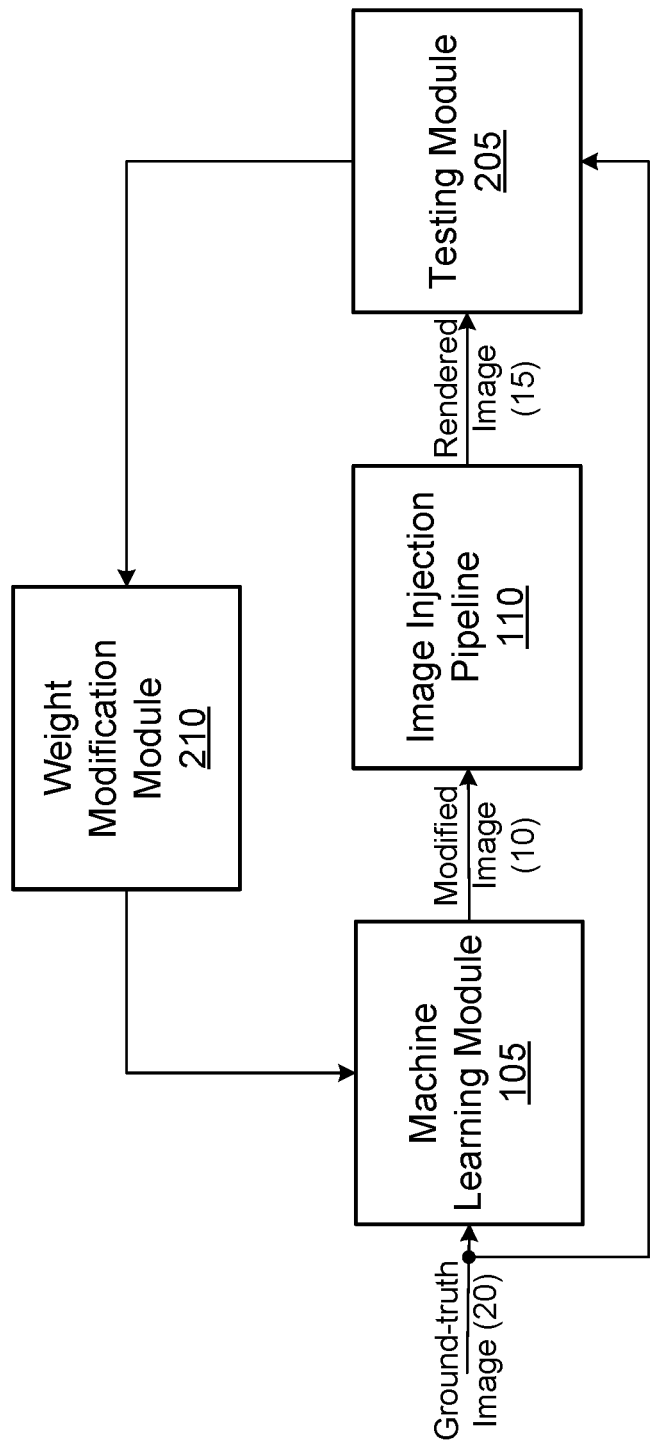
FIG. 2 illustrates a block diagram of a data flow for training a machine learning model according to an example implementation.

FIG. 2 illustrates a block diagram of a data flow for training a machine learning model according to an example implementation. As shown in FIG. 2, the data flow includes the machine learning (ML) module 105, the image injection pipeline 110, attesting module, and a weight modification module 210.

In an example implementation, a ground-truth image 20 can be input to the ML module 105. The ground-truth image 20 can be modified by the ML module 105 (e.g., by a ML model of the ML module 105) to generate a modified image 10. The modified image 10 can be input to the image injection pipeline 110 to generate a rendered image 15. The modified image 10 can include inversion effects (e.g., opposite effects) that can compensate for artifacts introduced by the image injection pipeline 110. The ground-truth image 20 can be one of a plurality of training images. The training images can be real data (e.g., images captured using a camera) and/or synthetic data (e.g., computer generated images).

The ground-truth image 20 can be used to train an ML model of the ML module 105. For example, the ML model can include a plurality of weights that are modified after each training iteration until a loss is minimized and/or a change in loss or losses associated with the model is minimized.

The testing module 205 can be configured to generate a loss based on a comparison of the rendered image 15 to the ground-truth image 20. For example, the loss can be calculated by a loss algorithm (e.g., a mean-squared loss). The loss can be based on a comparison of a pixel at a same position (e.g., coordinate) in the rendered image 15 to the ground-truth image 20. Then the weight modification module 210 can modify model parameters, i.e., weights and/or biases associated with the ML model, to minimize the loss.

In an example implementation, portions of the ground-truth image 20 can cause the image injection pipeline 110 to introduce greater or fewer artifacts (e.g., inversion effects or opposite effects) based on the characteristics of the portion of the ground-truth image 20. Therefore, the loss and/or the modified weight can be varied based on the artifacts introduced by the pipeline, which varies portions of the ground-truth image. For example, a characteristic of the ground-truth image 20 may not cause the LEA of the image injection pipeline 110 to introduce any artifacts. Therefore, a weight(s) associated with a characteristic of the LEA causing an artifact may not be modified by the weight modification module 210 and/or the corresponding variable(s) (e.g., pixel delta) input to a loss calculation may be varied and in some cases zeroed.

In an example implementation, the loss can be a mean squared loss. The mean squared loss can be based on a plurality of variables (e.g., pixel deltas). Therefore, calculating the mean squared loss can be varied by setting one or more of the plurality of variables to zero.

The loss can be a number indicating how bad the rendered image 15 was on a single example (e.g., ground-truth image 20). If the rendered image 15 is perfect (e.g., substantially the same as the ground-truth image 20), the loss is zero. otherwise, the loss is greater than zero. The goal of training is to find (e.g., change adjust, or modify) model parameters (e.g., weights and biases) that result in low loss, on average, across all training examples. The loss algorithm can be a squared loss, a mean squared error loss, and/or the like. Training can include modifying parameters associated with the ML model used by the machine learning module 105. In an example implementation, the weight modification module 210 can include a dataset including the parameters (e.g., weights and biases) that are applied to the ML model after a training iteration.

The loss can be a cost function. A first type of artifact can have a first cost and a second type of artifact can have a second cost greater than the first cost. In an example implementation, the weight modification module 210 can modify the weights based on the corresponding cost. In other words, the model may be trained to penalize the second type of artifact more than the first type of artifact, so that the second type of artifact counts more in the loss function than the first type of artifact. The result is that the cost function may allow more of the first type of artifact if doing so eliminates the second type of artifact, and thus results in lower loss. The types of artifacts can include hot pixels, ghosting, blurring, jitter, and/or the like. For example, the cost function can be a L1 norm cost function. The L1 norm cost function can be based on the absolute value difference between values associated with the ground-truth image 20 and values associated with the rendered image 15. The L1 norm cost function can be configured to penalize outlier artifacts. For example, artifacts caused by hot pixels can be outlier artifacts compared to other types of artifacts (e.g., ghosting artifacts).

Figure 3:
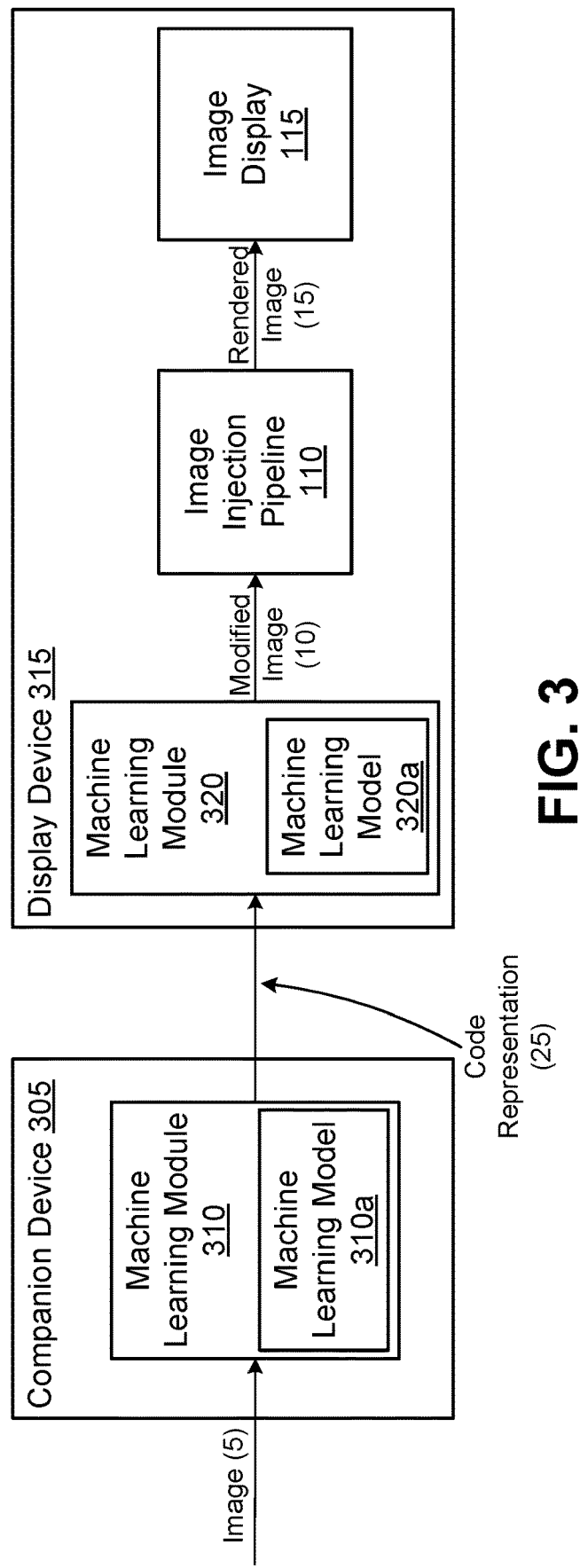
FIG. 3 illustrates another block diagram of a data flow for displaying an image according to an example implementation.

FIG. 3 illustrates another block diagram of a data flow for displaying an image according to an example implementation. As shown in FIG. 3, the data flow includes a companion device 305 (e.g., a mobile phone) and a display device 315 (e.g., a wearable device). The companion device 305 includes a machine learning (ML) module 310. The display device 315 includes a machine learning (ML) module 320, the image injection pipeline 110, and the image display 115. The ML module 310 can include at least one ML model 310a configured to modify an image.

In an example implementation, the machine learning module 105 can include an autoencoder as the ML model. An autoencoder can be a combination of two ML models. A first ML model is sometimes called an encoder and a second ML model is sometimes called a decoder. The autoencoder (e.g., ML model) is trained together (e.g., as in FIG. 2). However, in an example implementation, at runtime the encoder and decoder can be operated separately. In the example implementation of FIG. 3, the ML model can be an autoencoder where the ML module 310 can be the encoder (of the autoencoder) and the ML module 320 can be the decoder (of the autoencoder). In other implementations, the autoencoder (e.g., ML model) is implemented as one model on the companion device 305 or the display device 315.

In this example implementation, the companion device 305 and the display device 315 can share computing resources (sometimes called split-compute). In this example implementation, the companion device 305 can include (or receive) the image 5 the ML module 310 (e.g., encoder) can generate a code representation 25. The code representation 25 can sometimes be called a feature map. The feature map can include feature representations of the image 5. The code representation 25 can be smaller in size (e.g., fewer bits, use less memory, and the like) as compared to the image 5. In other words, the code representation 25 can be a compressed representation (e.g., as a feature map) of the image 5. This implementation can be advantageous because less bandwidth (e.g., fewer bits) may be communicated from the companion device 305 to the display device 315 as compared to communicating the image 5 or the modified image 10 (depending on the device including the ML model).

In an example implementation, the image 5 can be input to the ML module 310. The image 5 can be generated by (or stored in or received by) the companion device 305. The image 5 can be modified by the ML module 310 (e.g., by a ML model of the ML module 310) to generate the code representation 25. The code representation 25 can be communicated (e.g., wirelessly communicated) from the companion device 305 to the display device 315. The code representation 25 can be input to the ML module 320. The ML module 320 can generate the modified image 10. The ML module 320 can include at least one ML model 320a configured to generate the modified image 10 based on the code representation 25. The modified image 10 can be input to the image injection pipeline 110 to generate a rendered image 15. The modified image 10 is sometimes called an intermediate image or an injected image because the modified image 10 is injected into the image rendering pipeline. The modified image 10 can include inversion effects (e.g., opposite effects) that can compensate for artifacts introduced by the image injection pipeline 110. The rendered image 15 can be displayed on the image display 115.

Figure 4:
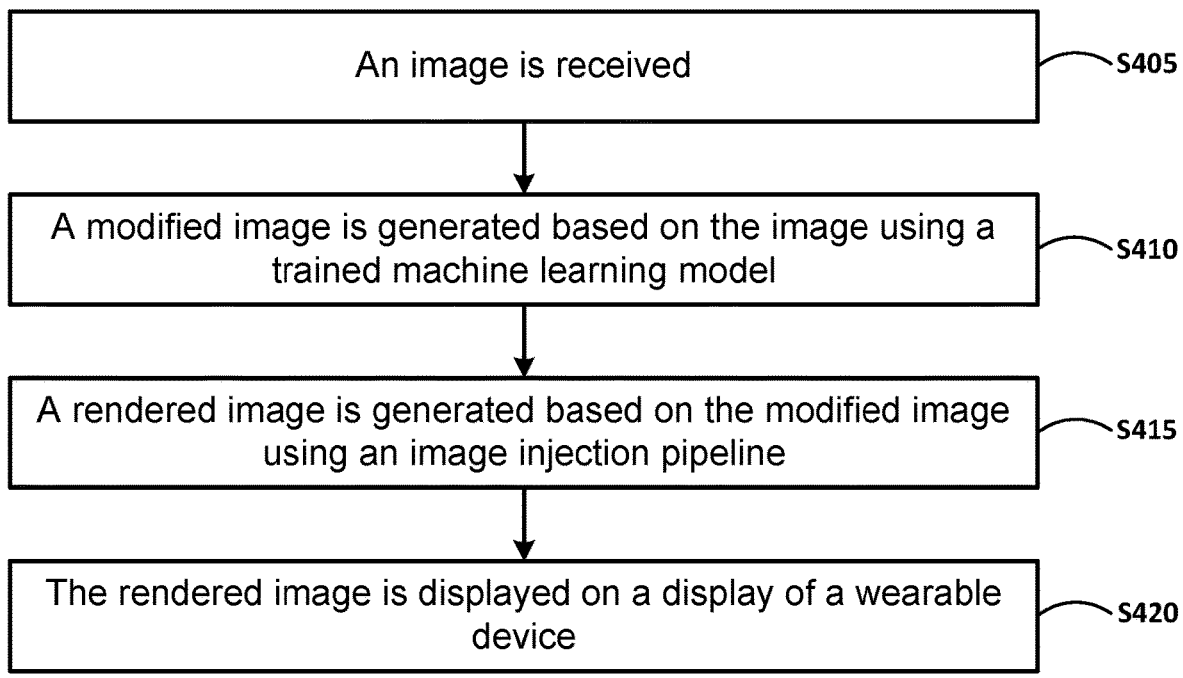
FIG. 4 illustrates a block diagram of a method of displaying an image according to an example implementation.

Example 1. FIG. 4 illustrates a block diagram of a method of displaying an image according to an example implementation. As shown in FIG. 4, in step S405 an image is received. In step S410 a modified image is generated based on the image using a trained machine learning model. In step S415 a rendered image is generated based on the modified image using an image injection pipeline. In step S420 the rendered image is displayed on a display of a wearable device.

Example 2. The method of Example 1, wherein the image injection pipeline can introduce artifacts to the rendered image, and the trained model can compensate for the artifacts introduced by the image injection pipeline.

Example 3. The method of Example 1 can further include before generating the rendered image, communicating the modified image from a companion device to the wearable device.

Example 4. The method of Example 1, wherein the trained model can include a first trained model and a second trained model, the method can further include generating a code representation based on the image using the first trained model and generating the modified image based on the code representation using the second trained model.

Example 5. The method of Example 4 can further include before generating the modified image, communicating the code representation from a companion device to the wearable device.

Example 6. The method of Example 1, wherein the image can be received from a companion device.

Example 7. The method of Example 1, wherein the image can be generated by the wearable device.

Example 8. The method of Example 1, wherein the trained model can be an autoencoder.

Figure 5:
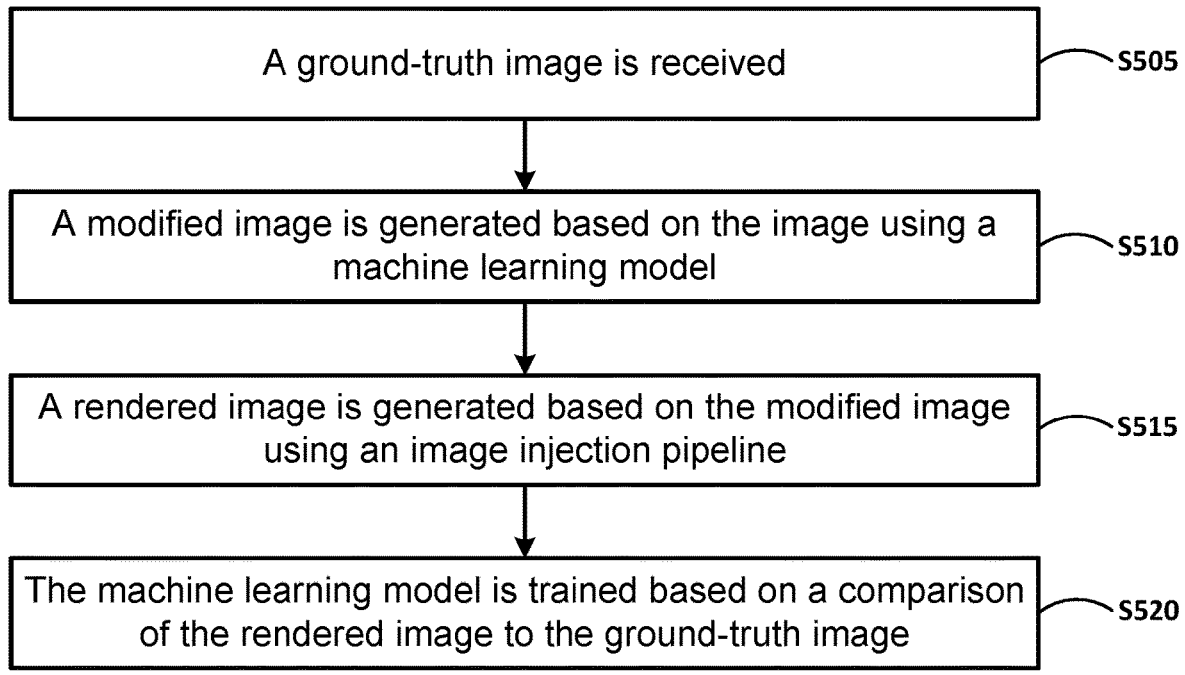
FIG. 5 illustrates a block diagram of a method of training a machine learning model according to an example implementation.

Example 9. FIG. 5 illustrates a block diagram of a method of training a machine learning model according to an example implementation. As shown in FIG. 5, in step S505 a ground-truth image is received. In step S510 a modified image is generated based on the image using a machine learning model. In step S515 a rendered image is generated based on the modified image using an image injection pipeline. In step S520 the machine learning model is trained based on a comparison of the rendered image to the ground-truth image.

Example 10. The method of Example 9, wherein the image injection pipeline can introduce artifacts to the rendered image, and the training of the model can compensate for the artifacts introduced by the image injection pipeline.

Example 11. The method of Example 10, wherein the training of the model can compensate for the artifacts introduced by the image injection pipeline by causing inversion effects that are opposite of the artifacts introduced by the image injection pipeline.

Example 12. The method of Example10 can further include generating a loss based on the comparison of the rendered image to the ground-truth image and modifying a weight associated with the model based on the loss, wherein the artifacts introduced by the image injection pipeline can vary portions of the ground-truth image, and at least one of the loss and the modified weight can be varied based on the artifacts introduced by the pipeline varying portions of the ground-truth image.

Example 13. The method of Example 12, wherein the loss can be a mean squared loss and calculating the mean squared loss can vary based on the artifacts introduced by the rendering pipeline varying portions of the ground-truth image.

Example 14. The method of Example 12, wherein the loss can be a cost function that uses a first cost and a second cost greater than the first cost a first type of artifact can have the first cost, and a second type of artifact can have the second cost.

Example 15. The method of Example 9, wherein the model can be an autoencoder.

Example 16. A method can include any combination of one or more of Example 1 to Example 15.

Example 17. A non-transitory computer-readable storage medium comprising instructions stored thereon that, when executed by at least one processor, are configured to cause a computing system to perform the method of any of Examples 1-16.

Example 18. An apparatus comprising means for performing the method of any of Examples 1-16.

Example 19. An apparatus comprising at least one processor and at least one memory including computer program code, the at least one memory and the computer program code configured to, with the at least one processor, cause the apparatus at least to perform the method of any of Examples 1-16.

Figure 6:
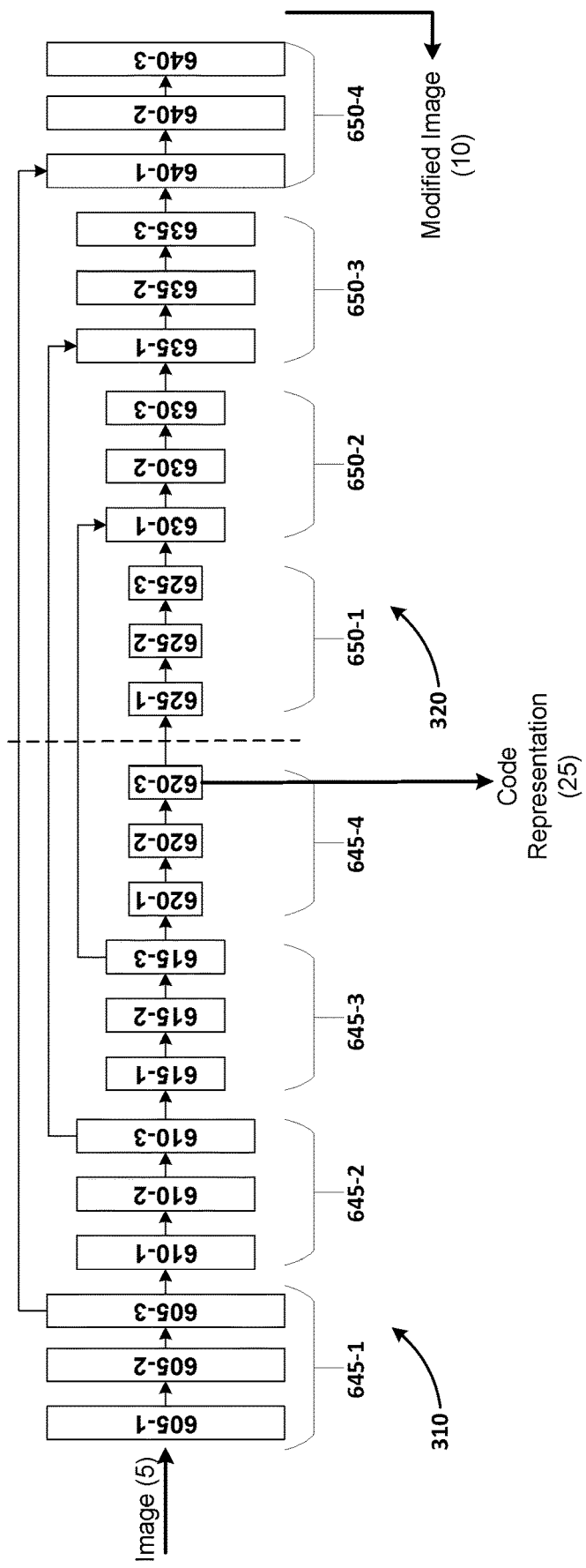
FIG. 6 illustrates a block diagram of a machine learning model according to an example implementation.

FIG. 6 illustrates a block diagram of a machine learning model (e.g., an auto encoder, an encoder-decoder network, and the like) according to an example implementation. The machine learning model of FIG. 6 can represent the machine learning model 105. A machine learning model can include at least one convolution layer(s) or convolution(s). For example, as shown in FIG. 6, the machine learning model 310 can include four (4) convolution layers each including three (3) convolutions where a first convolution layer 645-1 includes convolutions 605-1, 605-2, 605-3, a second convolution layer 645-2 includes convolutions 610-1, 610-2, 610-3, a third convolution layer 645-3 includes convolutions 615-1, 615-2, 615-3, and a fourth convolution layer 645-4 includes convolutions 620-1, 620-2, 620-3. Further, as shown in FIG. 6, the machine learning model 320 can include four (4) convolution layers each including three (3) convolutions, where a first convolution layer 650-1 includes convolutions 625-1, 625-2, 625-3, a second convolution layer 650-2 includes convolutions 630-1, 630-2, 630-3, a third convolution layer 650-3 includes convolutions 635-1, 635-2, 635-3, and a fourth convolution layer 650-4 includes convolutions 640-1, 640-2, 640-3. The machine learning model can include skip connection(s) (e.g., the output of convolution 605-3 can be communicated as input to convolution 640-1) and other computations needed to realize the segmentation model outputs.

A convolution layer (e.g., convolution layer 645-1, 645-2, 645-3, 645-4, 650-1, 650-2, 650-3, and/or 650-4) or convolution can be configured to extract features from an image 5. Features can be based on color, frequency domain, edge detectors, and/or the like. A convolution can have a filter (sometimes called a kernel) and a stride. For example, a filter can be a 1×1 filter (or 1×1×n for a transformation to n output channels, a 1×1 filter is sometimes called a pointwise convolution) with a stride of 1 which results in an output of a cell generated based on a combination (e.g., addition, subtraction, multiplication, and/or the like) of the features of the cells of each channel at a position of the M×M grid. In other words, a feature map having more than one depth or channel is combined into a feature map having a single depth or channel. A filter can be a 3×3 filter with a stride of 1 which results in an output with fewer cells in/for each channel of the M×M grid or feature map. The output can have the same depth or number of channels (e.g., a 3×3×n filter, where n=depth or number of channels, sometimes called a depthwise filter) or a reduced depth or number of channels (e.g., a 3×3×k filter, where k<depth or number of channels). Each channel, depth, or feature map can have an associated filter. Each associated filter can be configured to emphasize different aspects of a channel. In other words, different features can be extracted from each channel based on the filter (this is sometimes called a depthwise separable filter). Other filters are within the scope of this disclosure.

Another type of convolution can be a combination of two or more convolutions. For example, a convolution can be a depthwise and pointwise separable convolution. This can include, for example, a convolution in two steps. The first step can be a depthwise convolution (e.g., a 3×3 convolution). The second step can be a pointwise convolution (e.g., a 1×1 convolution). The depthwise and pointwise convolution can be a separable convolution in that a different filter (e.g., filters to extract different features) can be used for each channel or each depth of a feature map. In an example implementation, the pointwise convolution can transform the feature map to include c channels based on the filter. For example, an 8×8×3 feature map (or image) can be transformed to an 8×8×256 feature map (or image) based on the filter. In some implementations more than one filter can be used to transform the feature map (or image) to an M×M×c feature map (or image).

A convolution can be linear. A linear convolution describes the output, in terms of the input, as being linear time-invariant (LTI). Convolutions can also include a rectified linear unit (ReLU). A ReLU is an activation function that rectifies the LTI output of a convolution and limits the rectified output to a maximum. A ReLU can be used to accelerate convergence (e.g., more efficient computation).

In an example implementation, a combination of depthwise convolutions and depthwise and pointwise separable convolutions can be used. Each of the convolutions can be configurable (e.g., configurable feature, stride and/or depth). For example, the machine learning model 310 can include convolutions 605-1, 605-2, 605-3, 610-1, 610-2, 610-3, 615-1, 615-2, 615-3, 620-1, 620-2, and 620-3 that can transform the image 5 into the code representation 25 (sometimes called a feature map). The machine learning model 320 can include convolutions 625-1, 625-2, 625-3, 630-1, 610-2, 630-3, 635-1, 635-2, 635-3, 640-1, 640-2, and 640-3 that can incrementally transform the code representation 25 into the modified image 10.

Figure 7:
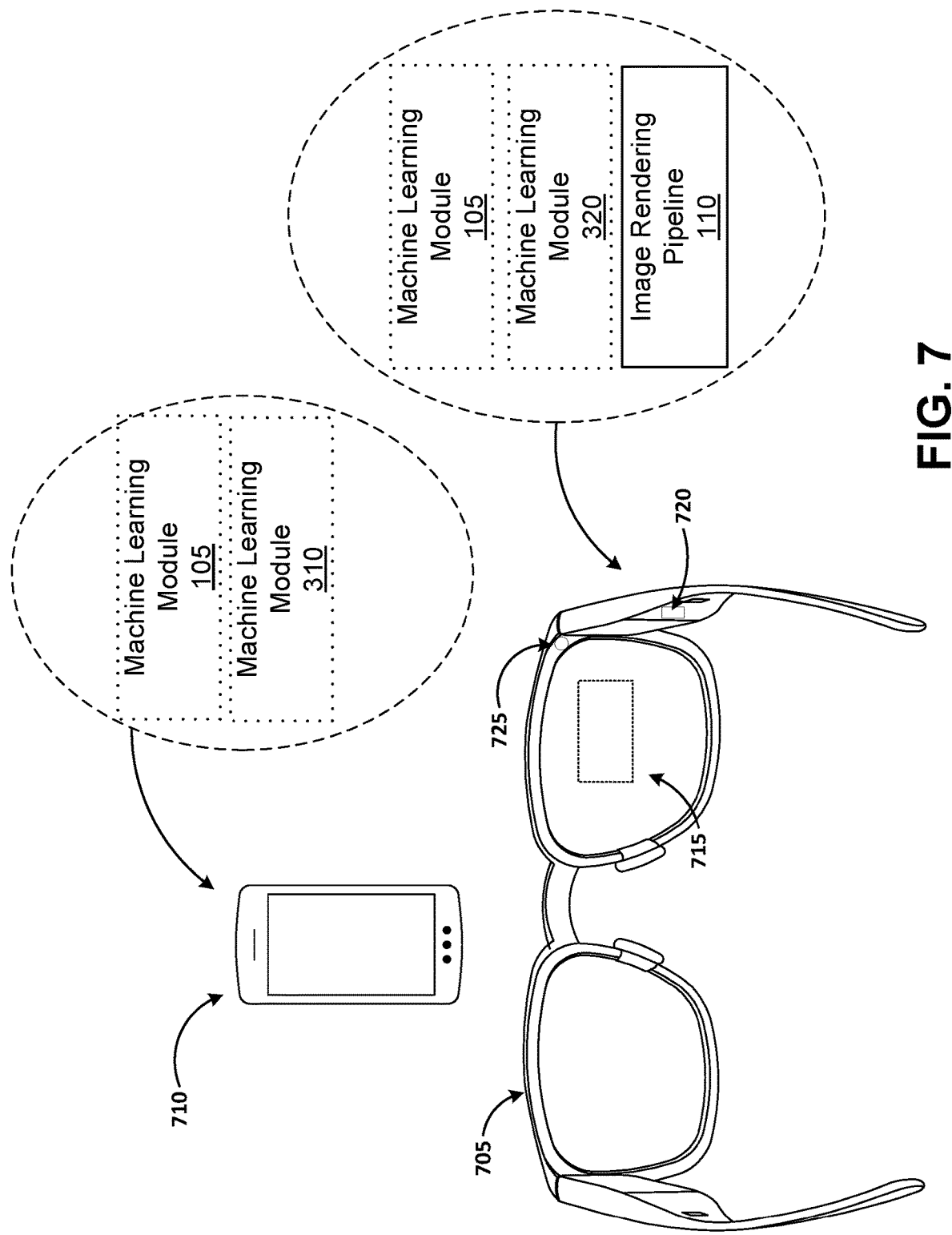
FIG. 7 illustrates a flow diagram for displaying an image on an overlay display according to an example implementation.

FIG. 7 illustrates a flow diagram for displaying an image on an overlay display according to an example implementation. As shown in FIG. 7, a wearable device 705 can include an overlay display 715, a module 720, and a projector 725. The wearable device can be communicatively coupled to a companion device 710. The module 720 can include the image injection pipeline 110 and, optionally, one or both of the machine learning module 105 and the machine learning module 320. The companion device 710 can include one or both of the machine learning module 105 and the machine learning module 310.

The lenses and the overlay display 715 of the wearable device 705 can be semi-transparent. Therefore, a user can view the real-world through the lenses and the overlay display 715. An image that is projected onto the overlay display 715 can have a portion of the real-world view as a background. An image (e.g., image 5) can represent the real-world view.

Figure 8:
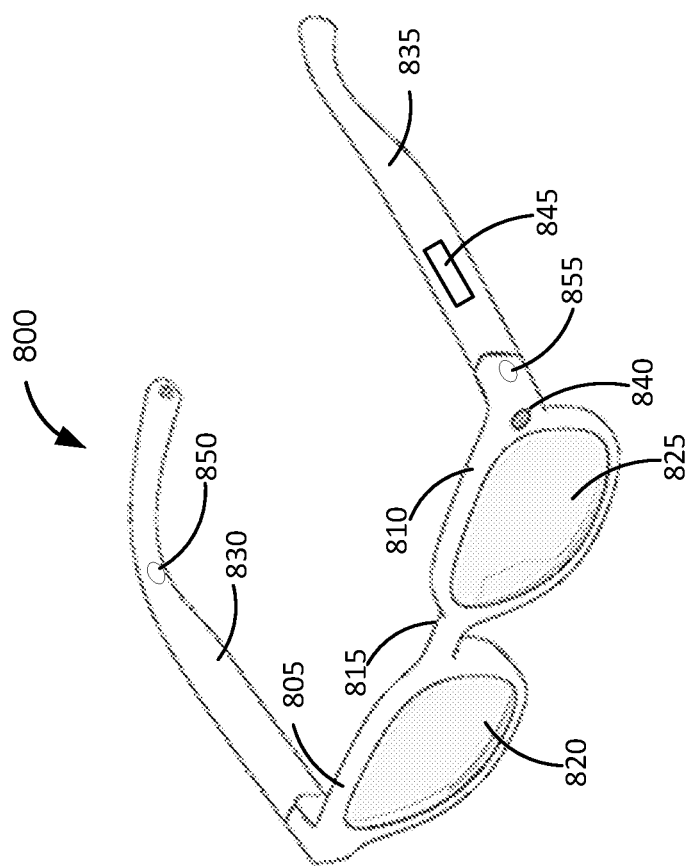
FIG. 8 illustrates a wearable device according to an example implementation.

FIG. 8 illustrates a wearable device according to an example implementation. As shown in FIG. 8, a wearable device 800 includes lens frame 805, lens frame 810, center frame support 815, lens element 820, lens element 825, extending side-arm 830, extending side-arm 835, image capture device 840 (e.g., a camera), on-board computing system 845, speaker 850, and microphone 855.

Each of the lens frame 805, 810, the center frame support 815 and the extending side-arms 830, 835 can be formed of a solid structure of plastic and/or metal or can be formed of a hollow structure of similar material so as to allow wiring and component interconnects to be internally routed through the wearable device 800. Other materials can be possible as well. At least one of the lens elements 820, 825 can be formed of any material that can suitably display a projected image or graphic. Each of the lens elements 820, 825 can also be sufficiently transparent to allow a user to see through the lens element. Combining these two features of the lens elements can facilitate an augmented reality or heads-up display where the projected image or graphic is superimposed over a real-world view as perceived by the user through the lens elements.

The center frame support 815 and the extending side-arms 830, 835 are configured to secure the wearable device 800 to a user's face via a user's nose and ears, respectively. The extending side-arms 830, 835 can each be projections that extend away from the lens frames 805, 810, respectively, and can be positioned behind a user's ears to secure the wearable device 800 to the user. The extending side-arms 830, 835 can further secure the wearable device 800 to the user by extending around a rear portion of the user's head. Additionally, or alternatively, for example, the wearable device 800 can connect to or be affixed within a head-mounted helmet structure. Other configurations for a wearable computing device are also possible.

The on-board computing system 845 is shown to be positioned on the extending side-arm 830 of the wearable device 800; however, the on-board computing system 845 can be provided on other parts of the wearable device 800 or can be remotely positioned from the wearable device 800 (e.g., the on-board computing system 845 could be wire- or wirelessly-connected to the wearable device 800). The on-board computing system 845 can include a processor and memory, for example. The on-board computing system 845 can be configured to receive and analyze data from the image capture device 840 (and possibly from other sensory devices) and generate images for output by the lens elements 820, 825.

The image capture device 840 can be, for example, a camera that is configured to capture still images and/or to capture video. In the illustrated configuration, image capture device 840 is positioned on the extending side-arm 830 of the wearable device 800; however, the image capture device 840 can be provided on other parts of the wearable device 800. The image capture device 840 can be configured to capture images at various resolutions or at different frame rates. Many image capture devices with a small form-factor, such as the cameras used in mobile phones or webcams, for example, can be incorporated into an example of the wearable device 800.

One image capture device 840 is illustrated. However, more image capture devices can be used, and each can be configured to capture the same view, or to capture different views. For example, the image capture device 840 can be forward facing to capture at least a portion of the real-world view perceived by the user. This forward-facing image captured by the image capture device 840 can then be used to generate an augmented reality where computer generated images appear to interact with or overlay the real-world view perceived by the user.

Example implementations can include a non-transitory computer-readable storage medium comprising instructions stored thereon that, when executed by at least one processor, are configured to cause a computing system to perform any of the methods described above. Example implementations can include an apparatus including means for performing any of the methods described above. Example implementations can include an apparatus including at least one processor and at least one memory including computer program code, the at least one memory and the computer program code configured to, with the at least one processor, cause the apparatus at least to perform any of the methods described above.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While example implementations may include various modifications and alternative forms, implementations thereof are shown by way of example in the drawings and will herein be described in detail. It should be understood, however, that there is no intent to limit example implementations to the particular forms disclosed, but on the contrary, example implementations are to cover all modifications, equivalents, and alternatives falling within the scope of the claims. Like numbers refer to like elements throughout the description of the figures.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example implementations. Example implementations, however, be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular implementations only and is not intended to be limiting of example implementations. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations are not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

What is claimed is:

1. A method comprising:
receiving a code representation of an image from a companion device communicatively coupled to a wearable device, the code representation being generated using a first trained model;
generating a modified image based on the code representation using a second trained model;
generating a rendered image based on the modified image using an image injection pipeline; and
displaying the rendered image on a display of the wearable device.

2. The method of claim 1, wherein,
the image injection pipeline introduces artifacts to the rendered image, and
the second trained model is trained to compensate for the artifacts introduced by the image injection pipeline.

3. The method of claim 1, further comprising:
before generating the rendered image, communicating the modified image from the companion device to the wearable device.

4. The method of claim 1, wherein the image is received from the companion device.

5. The method of claim 1, wherein the image is generated by the wearable device.

6. The method of claim 1, wherein the second trained model is an autoencoder.

7. The method of claim 1, wherein
the image injection pipeline includes a light engine assembly and a see-through stack assembly, and
the second trained model is trained to compensate for artifacts introduced by at least one of the light engine assembly or the see-through stack assembly.

8. The method of claim 7, wherein the artifacts are based on at least one of luminance, luminance uniformity, color, color uniformity, contrast, light direction, or a pixel pattern of the image.

9. The method of claim 1, wherein
the second trained model is trained to generate the modified image by adding inversion artifacts to an image decoded from the code representation, and
the inversion artifacts are configured to cancel artifacts introduced by the image injection pipeline.

10. The method of claim 9, wherein the artifacts are based on at least one of luminance, luminance uniformity, color, color uniformity, contrast, light direction, or a pixel pattern of the image.

11. A method comprising:
receiving a ground-truth image;
generating a modified image based on the ground-truth image using a model;
generating a rendered image based on the modified image using an image injection pipeline; and
training the model based on a comparison of the rendered image to the ground-truth image, wherein the training of the model compensates for artifacts introduced by the image injection pipeline by causing inversion effects that are opposite of the artifacts introduced by the image injection pipeline.

12. The method of claim 11, further comprising:
generating a loss based on the comparison of the rendered image to the ground-truth image; and
modifying a weight associated with the model based on the loss, wherein,
the artifacts introduced by the image injection pipeline vary portions of the ground-truth image, and
at least one of the loss and the modified weight is varied based on the artifacts introduced by the image injection pipeline varying portions of the ground-truth image.

13. The method of claim 12, wherein,
the loss is a mean squared loss, and
calculating the mean squared loss varies based on the artifacts introduced by a rendering pipeline varying portions of the ground-truth image.

14. The method of claim 12, wherein,
the loss is a cost function that uses a first cost and a second cost greater than the first cost,
a first type of artifact has the first cost, and
a second type of artifact has the second cost.

15. The method of claim 11, wherein the model is an autoencoder.

16. A non-transitory computer-readable storage medium comprising instructions stored thereon that, when executed by at least one processor, are configured to cause a computing system to:
receive a code representation of an image from a companion device communicatively coupled to a wearable device, the code representation being generated using a first trained model;
generate a modified image based on the code representation using a second trained model;
generate a rendered image based on the modified image using an image injection pipeline; and
display the rendered image on a display of the wearable device.

17. The non-transitory computer-readable storage medium of claim 16, wherein the instructions further cause the computing system to:
before generating the rendered image, communicate the modified image from the companion device to the wearable device.

18. The non-transitory computer-readable storage medium of claim 16, wherein the second trained model is an autoencoder.

19. The non-transitory computer-readable storage medium of claim 16, wherein
the image injection pipeline introduces artifacts to the rendered image, and
the second trained model is trained to compensate for the artifacts introduced by the image injection pipeline.

20. The non-transitory computer-readable storage medium of claim 16, wherein the image is generated by the wearable device.

* * * * *